US012767014B2

(12) United States Patent
Lee et al.

(10) Patent No.: US 12,767,014 B2
(45) Date of Patent: Oct. 20, 2026

(54) FOREIGN SUBSTANCE BLOCKING AND HIDDEN WIRING STRUCTURE OF SEAT LONG-RAIL

(71) Applicant: HYUNDAI TRANSYS INC., Seosan-si (KR)

(72) Inventors: Se Hwan Lee, Suwon-si (KR); In Gul Baek, Hwaseong-si (KR); Gyong Min Kim, Hwaseong-si (KR); Eom Seok Yoo, Hwaseong-si (KR); Ki Young Yun, Suwon-si (KR); Jin Wook Choi, Hwaseong-si (KR)

(73) Assignee: HYUNDAI TRANSYS INC., Seosan-si (KR)

(*) Notice: Subject to any disclaimer, the term of this patent is extended or adjusted under 35 U.S.C. 154(b) by 226 days.

(21) Appl. No.: 18/708,577

(22) PCT Filed: Nov. 17, 2022

(86) PCT No.: PCT/KR2022/018198
§ 371 (c)(1),
(2) Date: May 8, 2024

(87) PCT Pub. No.: WO2023/101275
PCT Pub. Date: Jun. 8, 2023

(65) Prior Publication Data

US 2024/0416801 A1 Dec. 19, 2024

(30) Foreign Application Priority Data

Nov. 30, 2021 (KR) ........................ 10-2021-0168396

(51) Int. Cl.
*B60N 2/07* (2006.01)
*B60R 16/02* (2006.01)
*B60N 2/14* (2006.01)

(52) U.S. Cl.
CPC ........ *B60N 2/0725* (2013.01); *B60R 16/0215* (2013.01); *B60N 2/143* (2013.01)

(58) Field of Classification Search
CPC ...... B60N 2/07; B60N 2/0702; B60N 2/0722; B60N 2/0715; B60N 2/0725; B60N 2/143; B60R 16/0215
See application file for complete search history.

(56) References Cited

U.S. PATENT DOCUMENTS 6,145,911 A * 11/2000 Sturt ...................... B60N 3/042 296/65.01
2004/0159764 A1* 8/2004 Oshima ................ B60N 2/0725 296/65.13

(Continued)

FOREIGN PATENT DOCUMENTS

JP 2011-025744 A 2/2011
JP 2016-150599 A 8/2016

(Continued)

OTHER PUBLICATIONS

KR 10-2241156 and computer translation (Year: 2021).*

(Continued)

*Primary Examiner* — Gregory A Blankenship
(74) *Attorney, Agent, or Firm* — Quantum Patent Law Firm; Seongyoune Kang

(57) ABSTRACT

The present disclosure relates to a foreign substance blocking and hidden wiring structure of a seat long-rail. The present disclosure provides a foreign substance blocking and hidden wiring structure of a seat long-rail, including a lower rail fixed to a vehicle body and including a slot portion formed in an upper portion thereof, a block guide partially located on the lower rail and protruding to the outside of the slot portion, an upper rail located on the upper end of the lower rail and coupled to the block guide, a slide block provided in plural at a position corresponding to the slot (Continued)

portion and configured to open the slot portion at a position corresponding to the upper rail, and a block guide pin formed on an upper surface of the block guide so that the slide block opens or blocks the slot portion according to movement of the upper rail.

10 Claims, 8 Drawing Sheets

(56) References Cited

U.S. PATENT DOCUMENTS

| | | | | |
|---|---|---|---|---|
| 2009/0298326 | A1* | 12/2009 | Van Der Mee | B60N 2/06 439/501 |
| 2014/0091610 | A1* | 4/2014 | Clark | B60N 2/07 297/463.1 |
| 2014/0349042 | A1* | 11/2014 | Schomacker | B64D 11/0696 428/34.1 |
| 2018/0147956 | A1* | 5/2018 | Furukawa | B60N 2/071 |
| 2018/0370388 | A1* | 12/2018 | Nakamura | B60N 2/0224 |
| 2020/0086767 | A1* | 3/2020 | Ogasawara | B60N 2/0715 |
| 2020/0276918 | A1* | 9/2020 | Kapusky | B60N 2/0732 |
| 2020/0282869 | A1* | 9/2020 | Tuffs | B60N 2/06 |
| 2021/0046850 | A1* | 2/2021 | Yamada | B60N 2/0725 |
| 2022/0134911 | A1* | 5/2022 | Kim | B60N 2/0725 248/429 |
| 2022/0161703 | A1* | 5/2022 | Jo | B62D 65/14 |
| 2023/0415616 | A1* | 12/2023 | Katsube | B60N 2/0715 |
| 2024/0416801 | A1* | 12/2024 | Lee | B60R 16/0215 |
| 2025/0001910 | A1* | 1/2025 | Jonsson | B60N 2/0725 |
| 2026/0054611 | A1* | 2/2026 | Dongwei | A44B 19/24 |

FOREIGN PATENT DOCUMENTS

| | | | |
|---|---|---|---|
| KR | 10-2019-0069705 | A | 6/2019 |
| KR | 10-2020-0003883 | A | 1/2020 |
| KR | 10-2241156 | B1 | 4/2021 |
| KR | 10-2260814 | B1 | 6/2021 |
| KR | 10-2286551 | B1 | 8/2021 |
| WO | 2014102900 | A1 | 7/2014 |

OTHER PUBLICATIONS

International Search Report in International Application No. PCT/KR2022/018198 dated Mar. 2, 2023.

Written Decision on Registration in Korean Application No. 10-2021-0168396 dated Jan. 22, 2024.

Request for the Submission of an Opinion in Korean Application No. 10-2021-0168396 dated Aug. 22, 2023.

* cited by examiner

【FIG. 1】
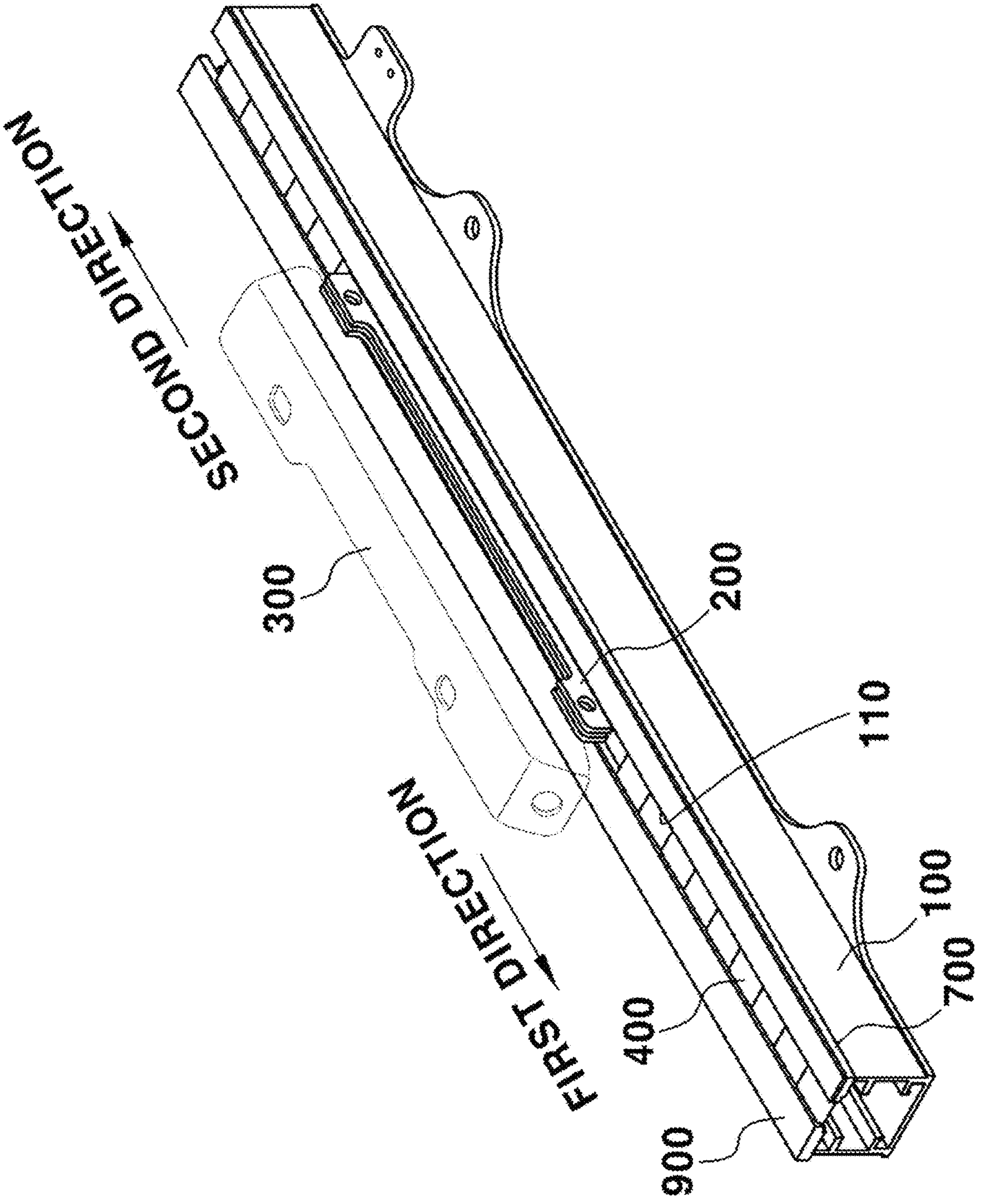

【FIG. 2A】
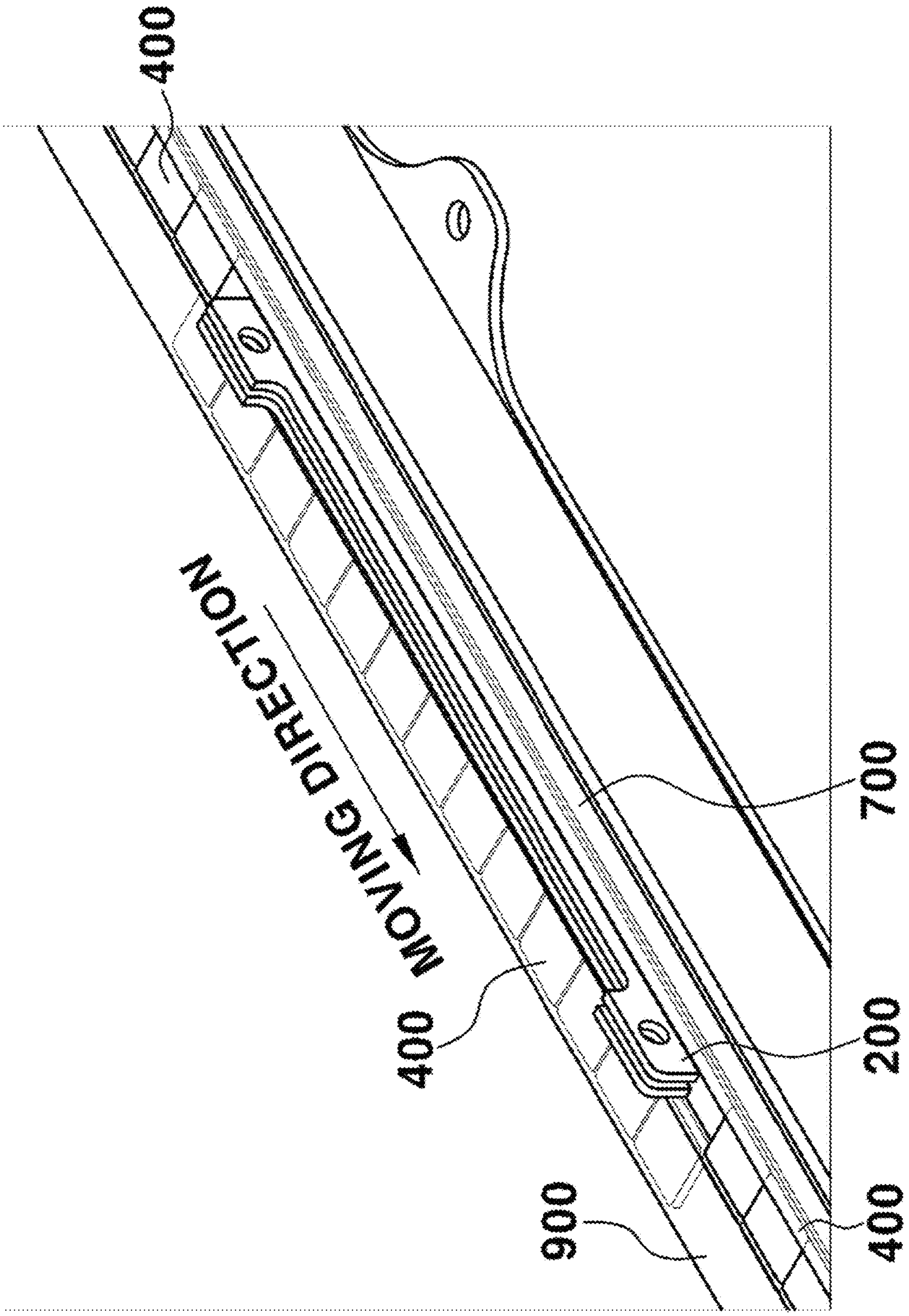

【FIG. 2B】
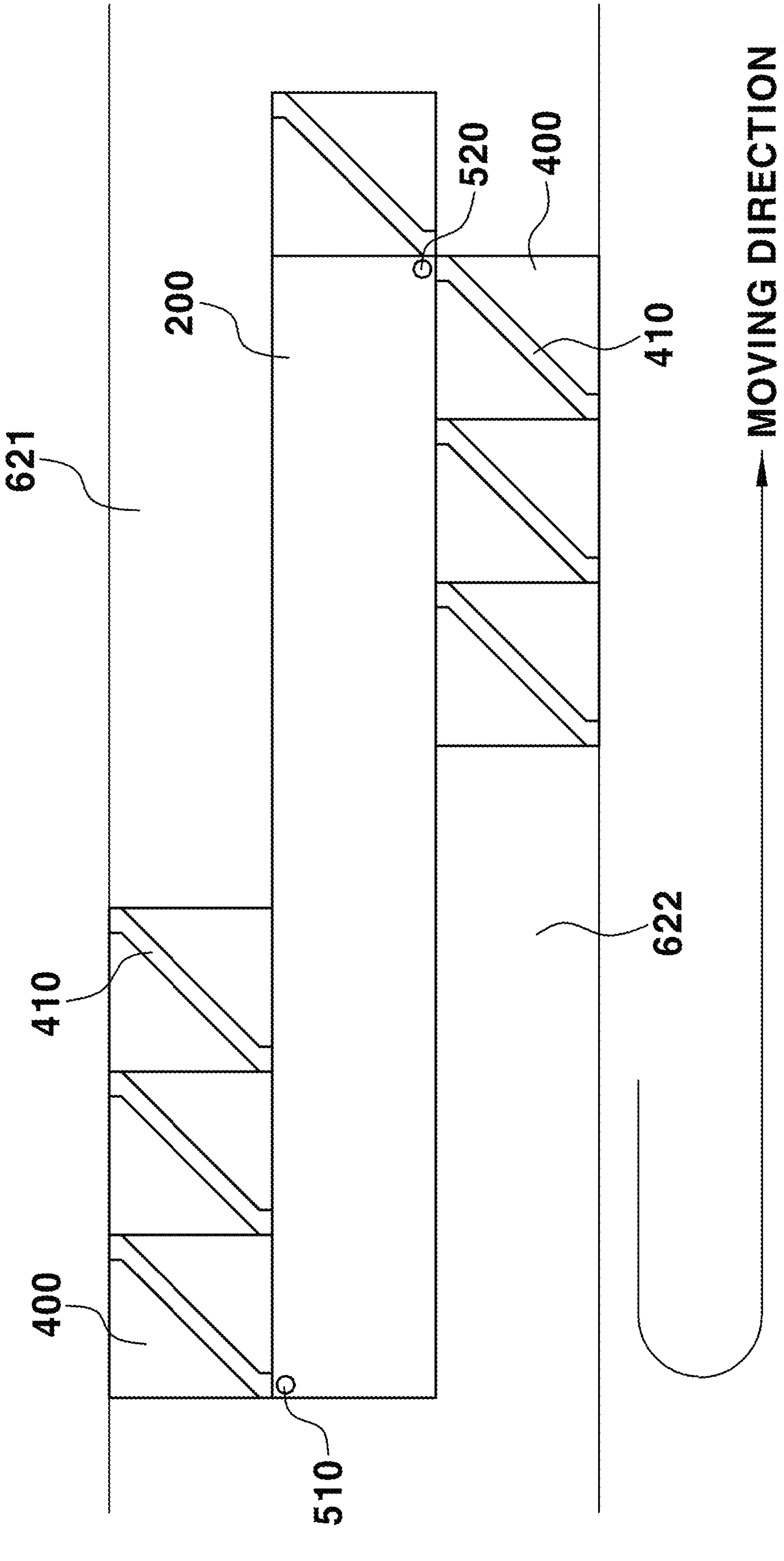

【FIG. 3】
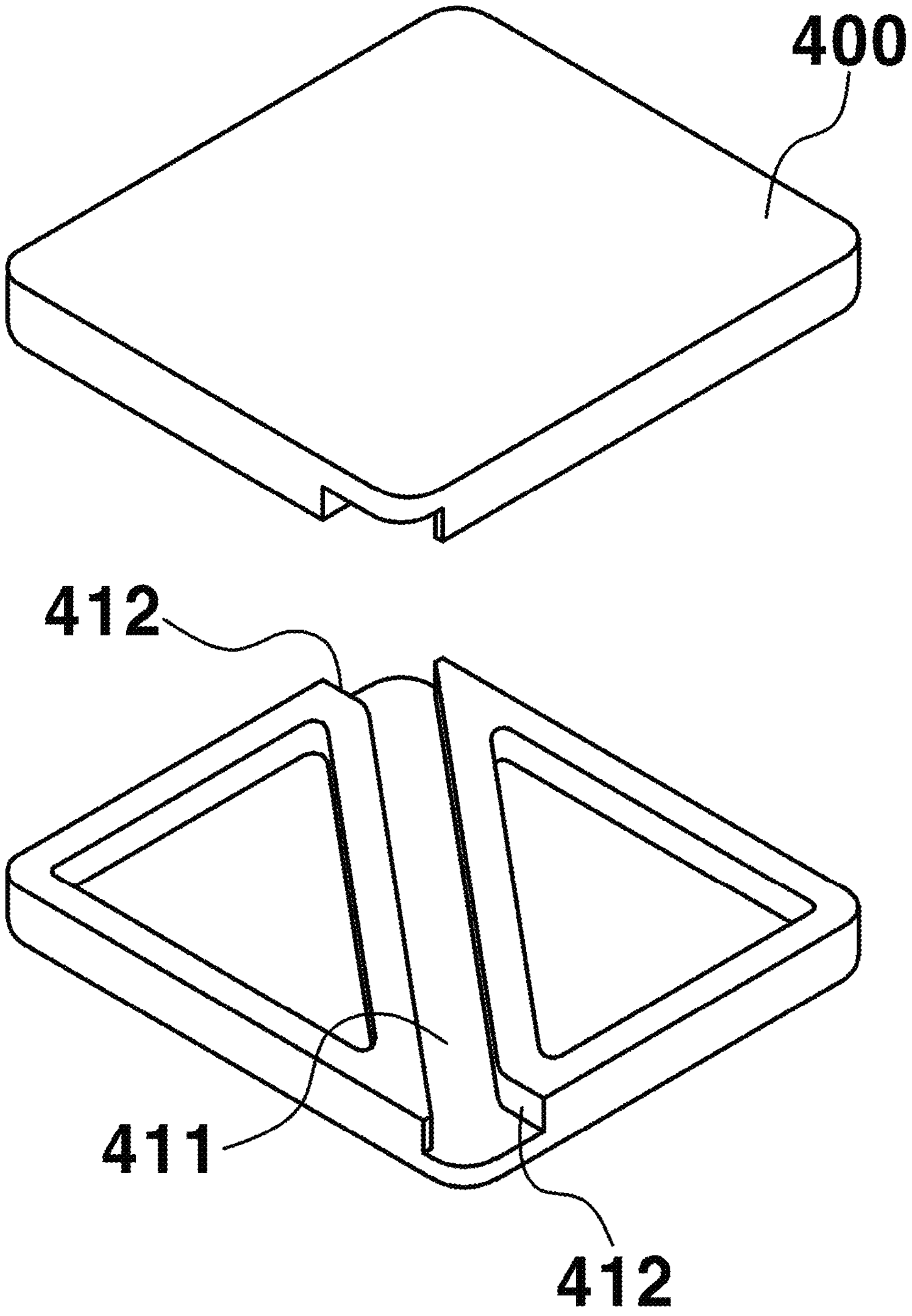

【FIG. 4】
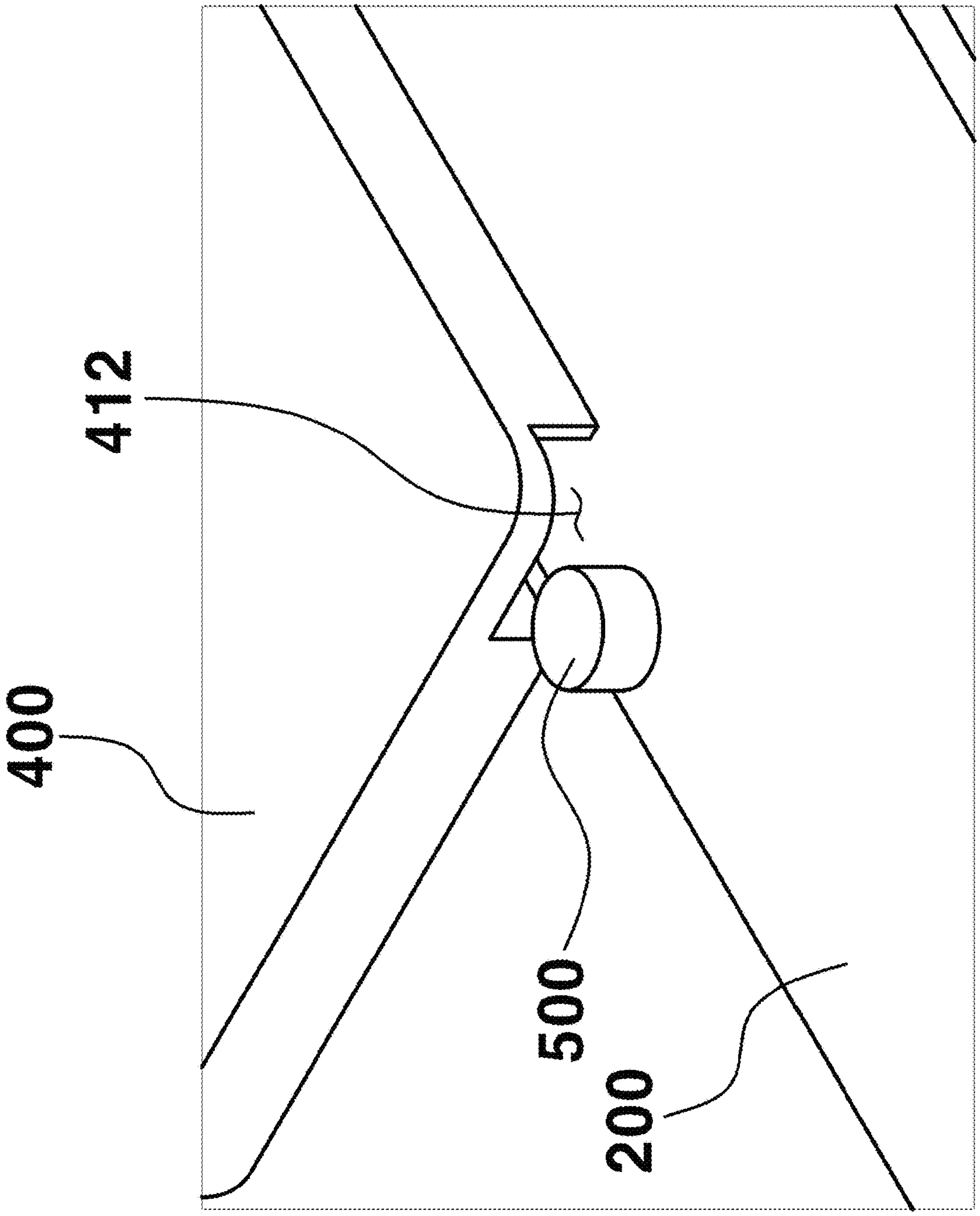

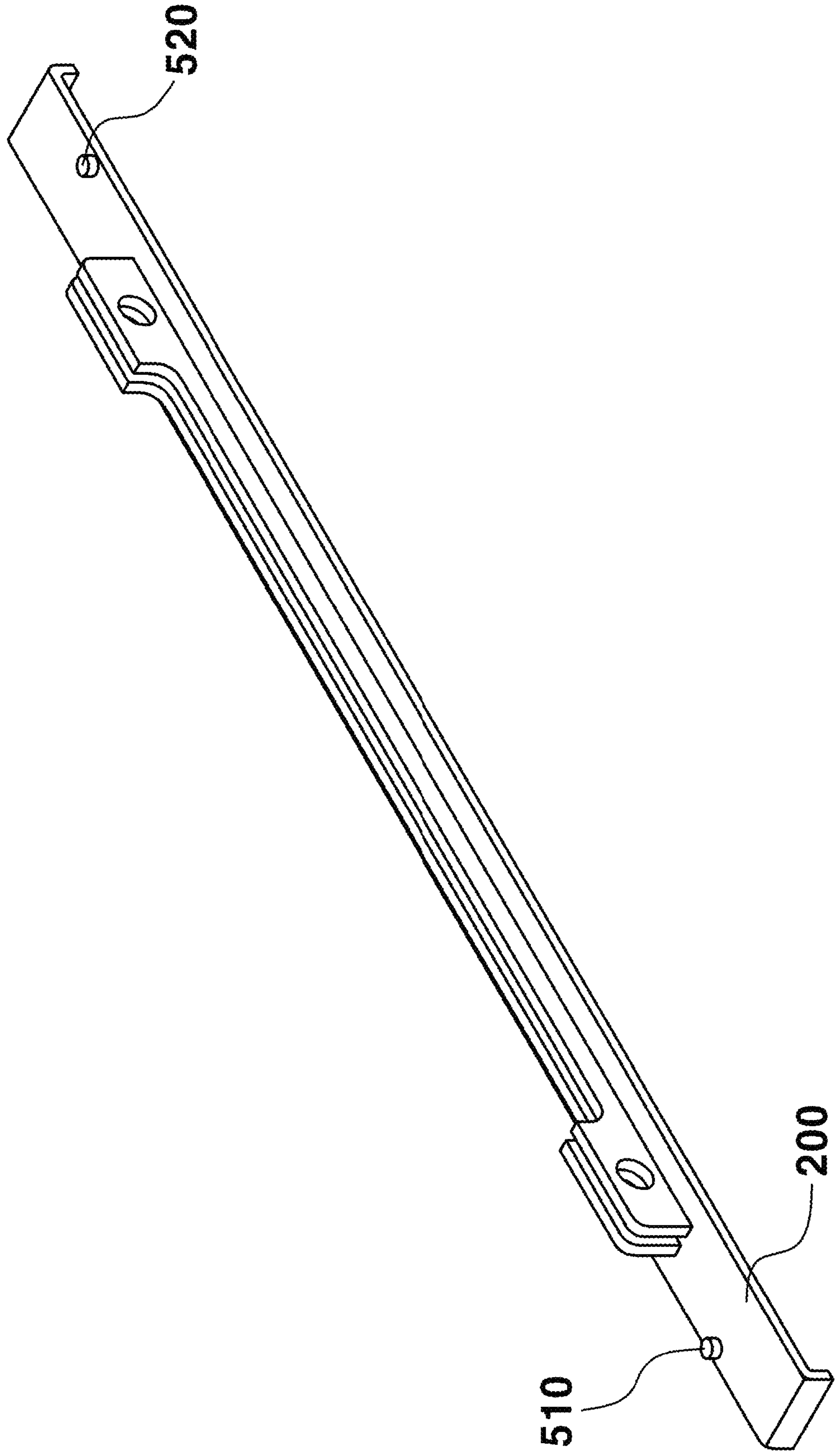
【FIG. 5】

【FIG. 6】
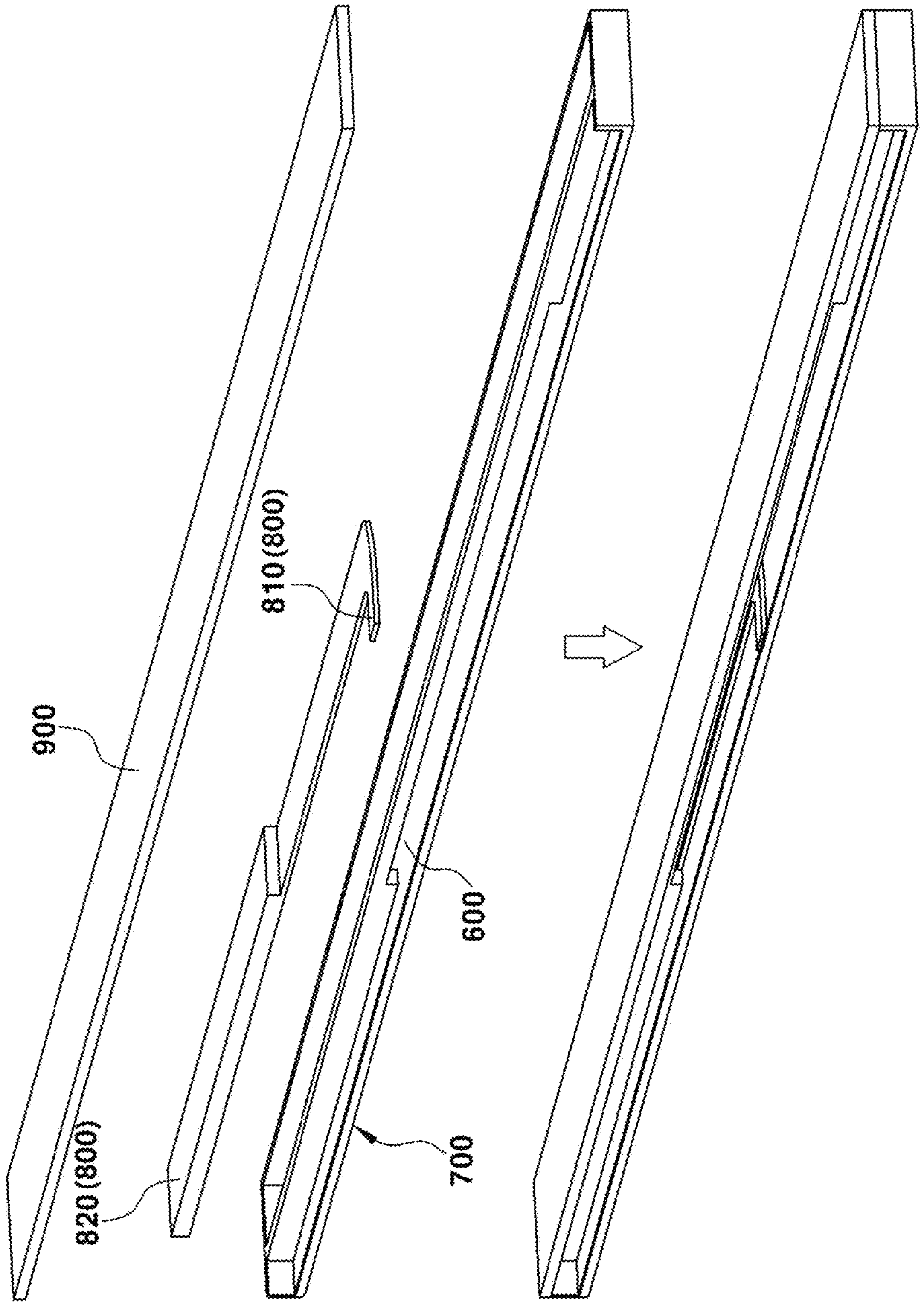

【FIG. 7】
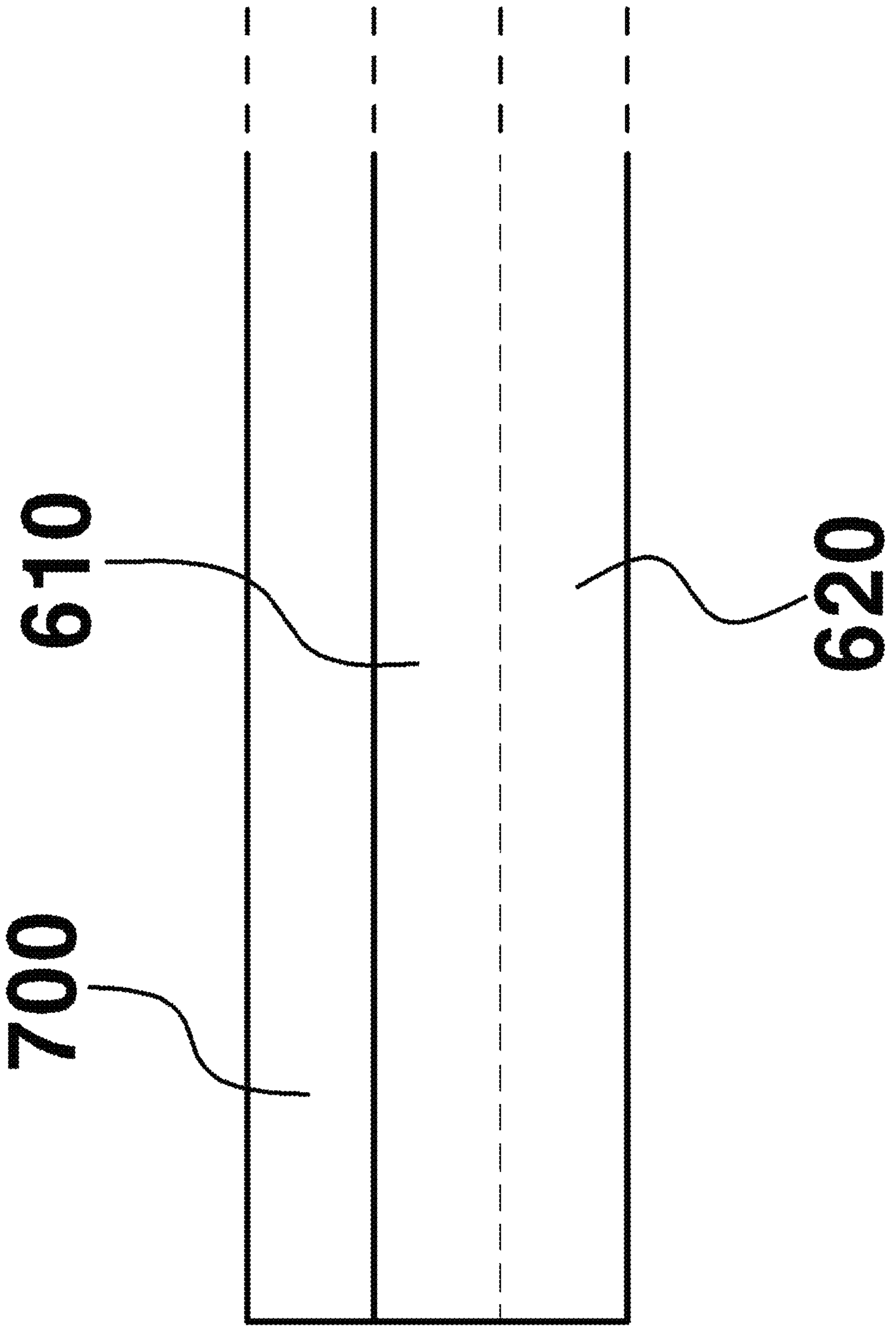

FOREIGN SUBSTANCE BLOCKING AND HIDDEN WIRING STRUCTURE OF SEAT LONG-RAIL

CROSS-REFERENCE TO RELATED APPLICATIONS

This patent application is a U.S. national stage application of International Application No. PCT/KR2022/018198, filed Nov. 17, 2022 and the entire contents of which are incorporated herein by reference, which claims priority to KR 10-2021-0168396, filed Nov. 30, 2021 and the entire contents of which are incorporated herein by reference.

TECHNICAL FIELD

The present disclosure relates to a foreign substance blocking and hidden wiring structure of a seat long-rail, and more particularly, to a foreign substance blocking and hidden wiring structure of a seat long-rail, which prevents introduction of foreign substances using slide blocks blocking a slot portion of a lower rail and prevents exposure of a wiring to the outside by placing the wiring in an inner space in a lower cover.

BACKGROUND ART

Generally, a seat of a vehicle is mounted so as to be slidable to the front and rear sides of the vehicle body, and such sliding movement is performed by a seat rail. Typically, in the case of a passenger vehicle provided with two rows of seats, a short rail is used to move a driver seat and a passenger seat, and in the case of a leisure vehicle provided with two or more rows of seats, short rails are applied to the first and second rows of seats to move the same, and long rails are applied to the third and subsequent rows of seats to move the same.

Here, the seat rail of the vehicle is configured to allow an upper rail coupled to a seat cushion frame to slide along a lower rail coupled to a floor panel of the vehicle body, and includes a lock mechanism that restrains free movement of the upper rail.

In addition, in order to enable a user to more conveniently use the forward-backward movement function of the seat, a forward-backward moving device is driven by a motor. In particular, in order to move the upper rail forward and backward using a motor, wires through which power is applied to the motor and a control signal is transmitted to the motor to move the upper rail are required. In general, in a vehicle, a set of electric wirings for supply of power to electric devices of a vehicle body is referred to as a wiring harness.

Meanwhile, in the era of autonomous vehicles, the interior of the vehicle is a concept of a moving space in which a user in the vehicle freely reads, rests, or conducts business. Since seats are located at the center of this space, a swivel mechanism configured to rotate a driver seat 180 degrees to transition to a meeting mode and a long-slide mechanism configured to move a seat to transition to a loading mode have attracted remarkable attention.

In the case of a seat of an autonomous vehicle, a power long-rail is embedded below a carpet, and the stroke of the rail is increased in order to improve passenger convenience. In this case, an exposed section of a slit portion of a lower rail of the seat and an exposed section of a wiring are also increased in proportion to the increase in stroke. Therefore, there are problems in that foreign substances may be introduced through the exposed slit portion of the lower rail and the exposed wiring may be damaged by external force applied thereto.

DISCLOSURE

Technical Problem

The present disclosure has been made to solve the above problems, and provides a foreign substance blocking and hidden wiring structure of a seat long-rail, which is equipped with slide blocks blocking a slot portion of a lower rail.

In addition, the present disclosure provides a foreign substance blocking and hidden wiring structure of a seat long-rail, which prevents exposure of a wiring to the outside by placing the wiring in an inner space in a lower cover.

The objects of the present disclosure are not limited to the above-mentioned objects, and other objects not mentioned herein will be understood from the following description, and will become apparent with reference to the embodiments of the present disclosure. In addition, the objects of the present disclosure can be accomplished by the components described in the appended claims and combinations thereof.

Technical Solution

A foreign substance blocking and hidden wiring structure of a seat long-rail for accomplishing the above objects of the present disclosure includes the following configuration.

In accordance with an embodiment of the present disclosure, there is provided a foreign substance blocking and hidden wiring structure of a seat long-rail, including a lower rail fixed to a vehicle body and including a slot portion formed in an upper portion thereof, a block guide partially located on the lower rail and configured to protrude to the outside of the slot portion, an upper rail located on the upper end of the lower rail and configured to be coupled to the block guide, a slide block provided in plural at a position corresponding to the slot portion and configured to open the slot portion at a position corresponding to the upper rail, and a block guide pin formed on an upper surface of the block guide so as to allow the slide block to open or block the slot portion according to movement of the upper rail.

In addition, the foreign substance blocking and hidden wiring structure of a seat long-rail may include a lower cover extending along an upper surface of the lower rail and including a slit portion formed in an inner surface thereof, a wiring part located on the inner surface of the lower cover, and an upper cover extending along an upper surface of the lower cover. The slide block located at a position corresponding to the upper rail may be inserted into the slit portion according to movement of the upper rail.

In addition, the slit portion may include a wiring slit portion located adjacent to the upper cover and formed to allow the wiring part to be inserted thereinto and a block slit portion located adjacent to the wiring slit portion and formed to allow the slide block to be inserted thereinto. The block slit portion may include a left slit portion formed on the left side with respect to the slot portion and a right slit portion formed on the right side with respect to the slot portion.

In addition, the wiring part may include a wiring connector connected to a driving unit of the upper rail and a wiring configured to apply an electric current to the vehicle body.

In addition, the slide block may include a guide groove formed in a rear surface thereof in an oblique direction, and the block guide pin may be moved along the guide groove, whereby the slide block may be inserted into the block slit portion.

In addition, the guide groove may include an oblique portion formed to allow the block guide pin to be moved in the oblique direction and a connection portion located at each of both ends of the oblique portion and formed to allow the block guide pin to be moved in a longitudinal direction. The block guide pin may include a first block guide pin formed at a position corresponding to the connection portion and located on a surface of one end portion of the block guide oriented in a first direction so as to be adjacent to the left slit portion and a second block guide pin formed at a position corresponding to the connection portion and located on a surface of the other end portion of the block guide oriented in a second direction so as to be adjacent to the right slit portion.

In addition, the first block guide pin may be moved to the connection portion adjacent to the first direction of the block guide, and the second block guide pin may be moved to the connection portion adjacent to the second direction of the block guide.

In addition, when the upper rail is moved in the first direction, the first block guide pin may be moved to the oblique portion, whereby the slide block may be inserted into the left slit portion, and the second block guide pin may be moved to the oblique portion, whereby the slide block may be moved to an upper surface of the slot portion.

In addition, when the upper rail is moved in the second direction, the first block guide pin may be moved to the oblique portion, whereby the slide block may be moved to the upper surface of the slot portion, and the second block guide pin may be moved to the oblique portion, whereby the slide block may be inserted into the right slit portion.

In addition, when the upper rail is moved in the longitudinal direction, the wiring may be moved along an inner side of the wiring slit portion.

Advantageous Effects

The present disclosure may obtain the following effects through the above embodiments and through the configuration, combination, and use relationship to be described below.

The present disclosure has an effect of preventing damage to a rail by preventing introduction of foreign substances using slide blocks blocking a slot portion of a lower rail.

In addition, the present disclosure has an effect of preventing exposure of a wiring to the outside and thus preventing damage to the wiring by placing the wiring in an inner space in a lower cover.

DESCRIPTION OF DRAWINGS

FIG. 1 is a perspective view of a foreign substance blocking and hidden wiring structure of a seat long-rail according to an embodiment of the present disclosure.

FIG. 2A is a perspective view showing a state in which an upper rail is moved in a first direction in the foreign substance blocking and hidden wiring structure of a seat long-rail according to the embodiment of the present disclosure.

FIG. 2B is a perspective view showing a state in which the upper rail is moved in the first direction and then is reversed in a second direction in the foreign substance blocking and hidden wiring structure of a seat long-rail according to the embodiment of the present disclosure.

FIG. 3 is a perspective view of a slide block in the foreign substance blocking and hidden wiring structure of a seat long-rail according to the embodiment of the present disclosure.

FIG. 4 is a view showing a state before a block guide pin is inserted into a connection portion in the foreign substance blocking and hidden wiring structure of a seat long-rail according to the embodiment of the present disclosure.

FIG. 5 is a view showing a block guide, a first block guide pin, and a second block guide pin in the foreign substance blocking and hidden wiring structure of a seat long-rail according to the embodiment of the present disclosure.

FIG. 6 is a view showing an upper cover, a wiring part, and a lower cover in the foreign substance blocking and hidden wiring structure of a seat long-rail according to the embodiment of the present disclosure.

FIG. 7 is a cross-sectional view of a wiring slit portion and a block slit portion in the foreign substance blocking and hidden wiring structure of a seat long-rail according to the embodiment of the present disclosure.

BEST MODE

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

In addition, the term "part" or the like used herein refers to a unit for processing at least one function or operation, which may be implemented by hardware or a combination of pieces of hardware.

In addition, in this specification, the "height direction", the "width direction", and the "longitudinal direction" are directions indicated based on a vehicle.

In addition, in this specification, the "first direction" is a forward longitudinal direction, and the "second direction" is a backward longitudinal direction.

In addition, in this specification, the "left" is a left side in the width direction with respect to a slot portion 110 when viewed in the second direction, and the "right" is a right side in the width direction with respect to the slot portion 110 when viewed in the second direction.

Further, in this specification, terms such as "first", "second", etc. are used to distinguish between components having the same name. The order or sequence of corresponding components is not limited by these terms.

Additionally, when an element is referred to as being "on" or "above" another element, it may be "directly on" the other element, or one or more intervening elements may also be present. Also, when an element is referred to as being "under" or "below" another element, it may be "directly under" the other element, or one or more intervening elements may also be present.

FIG. 1 is a perspective view of a foreign substance blocking and hidden wiring structure of a seat long-rail according to an embodiment of the present disclosure. FIG. 2A is a perspective view showing a state in which an upper rail is moved in the first direction in the foreign substance blocking and hidden wiring structure of a seat long-rail according to the embodiment of the present disclosure. FIG. 2B is a perspective view showing a state in which the upper rail is moved in the first direction and then is reversed in the second direction in the foreign substance blocking and hidden wiring structure of a seat long-rail according to the embodiment of the present disclosure.

Referring to FIGS. 1, 2A, and 2B, a foreign substance blocking and hidden wiring structure of a seat long-rail according to an embodiment of the present disclosure may include a lower rail 100, a block guide 200, an upper rail 300, a slide block 400, and a block guide pin 500.

The lower rail 100 may be fixed to a vehicle body. More preferably, the lower rail 100 may be fixedly mounted inside a floor panel of the vehicle body so as to extend in the longitudinal direction. The lower rail 100 may include a slot portion 110 formed in an upper portion thereof.

The slot portion 110 may be an open groove formed in the upper portion of the lower rail 100. More preferably, the slot portion 110 may be visible through an open portion in the floor panel. The slot portion 110 may extend in the longitudinal direction of the upper surface of the lower rail 100 to serve as a path along which a seat slides in the longitudinal direction.

The block guide 200 may be partially located on the lower rail 100 and may protrude to the outside of the slot portion 110. More preferably, the block guide 200 may extend in the longitudinal direction along the lower rail 100 and may protrude to the outside of the upper portion of the slot portion 110.

The upper rail 300 may be located on the upper end of the lower rail 100 and may be coupled to the block guide 200. More preferably, the upper rail 300 may be spaced apart from the lower rail 100 and may be partially coupled to the block guide 200 to slide along the lower rail 100. The upper rail 300 may be connected to a seat of the vehicle to allow the seat to slide.

The slide block 400 may be provided in plural at a position corresponding to the slot portion 110. More preferably, the slide blocks 400 may be configured such that the slot portion 110 formed at a position corresponding to the upper rail 300 is open. The slide blocks 400 located at a position not corresponding to the upper rail 300 may be located on the upper surface of the slot portion 110. Since the slide blocks 400 are located on the upper surface of the slot portion 110, it is possible to prevent introduction of foreign substances through the slot portion 110 formed at a position corresponding to the upper rail 300. Accordingly, it is possible to prevent damage to operational components in the lower rail 100. In addition, each of the slide blocks 400 may include an elastic member so as to be supported after being moved in a width direction.

The block guide 200 may be configured to move the slide blocks 400. More preferably, the block guide 200 may be configured to move the slide blocks 400 in the width direction. When the slide blocks 400 are moved in the width direction, the slot portion 110 may be opened or blocked.

The block guide pin 500 may be formed on the upper surface of the block guide 200. More preferably, the block guide pin 500 may be formed to allow the slide blocks 400 to open or block the slot portion 110 as the upper rail 300 moves.

The block guide pin 500 may include a first block guide pin 510 located on a surface of one end portion of the block guide 200 that is oriented in a first direction and a second block guide pin 520 located on a surface of the other end portion of the block guide 200 that is oriented in a second direction. More preferably, the first block guide pin 510 may be configured to move the slide blocks 400 disposed in the first direction with respect to the upper rail 300. The second block guide pin 520 may be configured to move the slide blocks 400 disposed in the second direction with respect to the upper rail 300.

When the upper rail 300 is moved, the slide blocks 400 disposed in the first direction and the slide blocks 400 disposed in the second direction with respect to the upper rail 300 may be moved in the width direction. More preferably, when the slide blocks 400 disposed in the first direction with respect to the upper rail 300 is moved to the left with respect to the slot portion 110, the slide blocks 400 disposed in the second direction with respect to the upper rail 300 may be moved to the right with respect to the slot portion 110.

The foreign substance blocking and hidden wiring structure of a seat long-rail according to the embodiment of the present disclosure may further include a lower cover 700, a wiring part 800, and an upper cover 900. The wiring part 800 may be located on the lower cover 700, and the upper cover 900 may be assembled to the lower cover 700. The assembly of the lower cover 700, the wiring part 800, and the upper cover 900 may be located on the lower rail 100.

The lower cover 700 may extend along the upper surface of the lower rail 100. More preferably, the lower cover 700 may include a slit portion 600 formed in an inner surface thereof. The slit portion 600 may be formed so as to correspond to the shape of the wiring part 800.

The wiring part 800 may be located on the inner surface of the lower cover 700. More preferably, the wiring part 800 may be located in the slit portion 600 in the lower cover 700. When the upper rail 300 is moved, the wiring part 800 may be moved along the shape of the slit portion 600. When the upper rail 300 is moved, the wiring part 800 may be moved along the slit portion 600, thereby avoiding interference with movement of the seat.

The upper cover 900 may extend along the upper surface of the lower cover 700. More preferably, the upper cover 900 may extend on both sides of the slot portion 110. The upper cover 900 may be located above the wiring part 800 so that the wiring part 800 is not exposed to the outside.

When the upper rail 300 is moved, the slide blocks 400 located at a position corresponding to the upper rail 300 may be inserted into the slit portion 600. More preferably, the slit portion 600 may include a wiring slit portion 610 into which the wiring part 800 is inserted and a block slit portion 620 into which the slide blocks 400 are inserted. The wiring slit portion 610 may be located adjacent to the upper cover 900 in a height direction. The block slit portion 620 may be located adjacent to the wiring slit portion 610 in the height direction. When the upper rail 300 is moved, the wiring part 800 may be moved along the wiring slit portion 610, and the slide blocks 400 may be inserted into the block slit portion 620.

The block slit portion 620 may include a left slit portion 621 and a right slit portion 622. The left slit portion 621 may be formed on the left side in the width direction with respect to the slot portion 110. The right slit portion 622 may be formed on the right side in the width direction with respect to the slot portion 110.

When the upper rail 300 is moved, the slide blocks 400 disposed in the first direction with respect to the upper rail 300 may be inserted into the left slit portion 621, and the slide blocks 400 disposed in the second direction with respect to the upper rail 300 may be inserted into the right slit portion 622. Referring to FIG. 2A, when the upper rail 300 slides in the first direction, the slide blocks 400 disposed in the first direction may be inserted into the left slit portion 621. In addition, when the upper rail 300 slides in the first direction, the slide blocks 400 disposed in the second direction in a state of being inserted into the right slit portion 622 may be moved to the upper surface of the slot portion 110.

In another example, referring to FIG. 2B, when the upper rail 300 is moved in the first direction and then is reversed in the second direction, the slide blocks 400 disposed in the first direction in a state of being inserted into the left slit portion 621 and the slide blocks 400 disposed in the second direction in a state of being inserted into the right slit portion 622 may co-exist. More preferably, in the length region of the block guide 200, the slide blocks 400 disposed in the first direction and the slide blocks 400 disposed in the second direction may be inserted in opposite directions.

When the upper rail 300 is moved in the first direction, the first block guide pin 510 may guide the slide blocks 400 to be inserted into the left slit portion 621. When the upper rail 300 is moved in the first direction, the second block guide pin 520 may guide the slide blocks 400 to be moved to the upper surface of the slot portion 110.

On the other hand, when the upper rail 300 is moved in the second direction, the first block guide pin 510 may guide the slide blocks 400 to be moved to the upper surface of the slot portion 110. When the upper rail 300 is moved in the second direction, the second block guide pin 520 may guide the slide blocks 400 to be inserted into the right slit portion 622.

When the upper rail 300 is moved in the first or second direction, the slide blocks 400 may be moved in the width direction to open the upper surface of the slot portion 110 formed at a position corresponding to the upper rail 300 and to block the upper surface of the slot portion 110 formed at a position not corresponding to the upper rail 300.

FIG. 3 is a perspective view of the slide block 400 in the foreign substance blocking and hidden wiring structure of a seat long-rail according to the embodiment of the present disclosure. FIG. 4 is a view showing a state before the block guide pin 500 is inserted into a connection portion 412 in the foreign substance blocking and hidden wiring structure of a seat long-rail according to the embodiment of the present disclosure. FIG. 5 is a view showing the block guide 200, the first block guide pin 510, and the second block guide pin 520 in the foreign substance blocking and hidden wiring structure of a seat long-rail according to the embodiment of the present disclosure.

Referring to FIGS. 3 to 5, the slide block 400 may include a guide groove 410 formed in a rear surface thereof in an oblique direction. The guide groove 410 may be formed to allow the block guide pin 500 to move therealong. The block guide pin 500 may be moved along the guide groove 410, whereby the slide block 400 may be inserted into the block slit portion 620. The slide block 400 may have a flat front surface in order to block the upper surface of the slot portion 110.

The guide groove 410 may include an oblique portion 411 and connection portions 412. The oblique portion 411 may be formed to allow the block guide pin 500 to move in the oblique direction. The connection portions 412 may be located at respective ends of the oblique portion 411 and may be formed to allow the block guide pin 500 to move in the longitudinal direction.

When the block guide pin 500 enters the guide groove 410, the block guide pin 500 may move in the longitudinal direction along the connection portion 412, and then may move in the oblique direction along the oblique portion 411. The slide block 400 may sequentially move in the longitudinal direction, the oblique direction, and the longitudinal direction, thereby being completely inserted into the block slit portion 620 or completely blocking the upper surface of the slot portion 110. Adjacent slide blocks 400 may consecutively move in the longitudinal direction or the width direction.

The block guide pin 500 may be formed at a position corresponding to the connection portion 412. The block guide pin 500 may be inserted into the connection portion 412 to move the slide block 400 in the longitudinal direction. The first block guide pin 510 may be located on a surface of one end portion of the block guide 200 that is oriented in the first direction so as to be adjacent to the left slit portion 621. The second block guide pin 520 may be located on a surface of the other end portion of the block guide 200 that is oriented in the second direction so as to be adjacent to the right slit portion 622.

The first block guide pin 510 may move to the connection portion 412 adjacent to the first direction of the block guide 200. The first block guide pin 510 may be formed to allow the slide block 400 adjacent to the block guide 200 to be moved to the upper surface of the slot portion 110 or to be inserted into the left slit portion 621. The second block guide pin 520 may move to the connection portion 412 adjacent to the second direction of the block guide 200. The second block guide pin 520 may be formed to allow the slide block 400 adjacent to the block guide 200 to be moved to the upper surface of the slot portion 110 or to be inserted into the right slit portion 622.

When the upper rail 300 is moved in the first direction, the first block guide pin 510 may be moved to the oblique portion 411, and thus the slide block 400 may be inserted into the left slit portion 621. The first block guide pin 510 may be moved from the connection portion 412 formed in one end of the slide block 400 to the connection portion 412 formed in the other end of the slide block 400, whereby the slide block 400 may be completely inserted into the left slit portion 621. On the other hand, when the upper rail 300 is moved in the first direction, the second block guide pin 520 may be moved to the oblique portion 411, and thus the slide block 400 may be moved to the upper surface of the slot portion 110. The second block guide pin 520 may be moved from the connection portion 412 formed in one end of the slide block 400 to the connection portion 412 formed in the other end of the slide block 400, whereby the slide block 400 may completely block the upper surface of the slot portion 110.

When the upper rail 300 is moved in the second direction, the first block guide pin 510 may be moved to the oblique portion 411, and thus the slide block 400 may be moved to the upper surface of the slot portion 110. The first block guide pin 510 may be moved from the connection portion 412 formed in one end of the slide block 400 to the connection portion 412 formed in the other end of the slide block 400, whereby the slide block 400 may completely block the upper surface of the slot portion 110. On the other hand, when the upper rail 300 is moved in the second direction, the second block guide pin 520 may be moved to the oblique portion 411, and thus the slide block 400 may be inserted into the right slit portion 622. The second block guide pin 520 may be moved from the connection portion 412 formed in one end of the slide block 400 to the connection portion 412 formed in the other end of the slide block 400, whereby the slide block 400 may be completely inserted into the right slit portion 622.

FIG. 6 is a view showing the upper cover 900, the wiring part 800, and the lower cover 700 in the foreign substance blocking and hidden wiring structure of a seat long-rail according to the embodiment of the present disclosure, and FIG. 7 is a cross-sectional view of the wiring slit portion and the block slit portion 620 in the foreign substance blocking and hidden wiring structure of a seat long-rail according to the embodiment of the present disclosure.

Referring to FIGS. 6 and 7, the wiring part 800 may include a wiring connector 810 and a wiring 820. The wiring connector 810 may be connected to a driving unit of the upper rail 300. The upper rail 300 may be electrically driven by a driving unit such as a motor. Power may be supplied from a battery to the driving unit in response to switch manipulation by the user, and the upper rail 300 may be driven to slide in the first direction or the second direction by the driving unit.

The wiring 820 may be configured to apply an electric current to the vehicle body. More preferably, the wiring 820 may provide a power signal or a control signal to the driving unit of the upper rail 300. The wiring 820 may include a main wiring related to a vehicle interior load, a control wiring related to control, an extension wiring related to a door structure, an air bag wiring applied to an air bag, an engine wiring related to an engine compartment load, and a rear wiring related to a trunk load. When the upper rail 300 is moved in the longitudinal direction, the wiring 820 may be moved along the inner side of the wiring slit portion 610.

The shape of the wiring slit portion 610 may be formed to correspond to the shape of the wiring 820. The wiring slit portion 610 may be formed so as to prevent the wiring 820 from interfering therewith when the upper rail 300 is moved in the first direction or the second direction. The block slit portion 620 may be located under the wiring slit portion 610 and may be formed on each of both sides of the slot portion 110. The block slit portion 620 may be formed to have a shape corresponding to the shape of the slide block 400.

In summary, the present disclosure provides a foreign substance blocking and hidden wiring structure of a seat long-rail, which prevents introduction of foreign substances using the slide blocks 400 blocking the slot portion 110 of the lower rail 100 and prevents exposure of the wiring 820 to the outside by placing the wiring 820 in the inner space in the lower cover 700.

The detailed description is illustrative of the present disclosure. Also, the above description is intended to illustrate and explain preferred embodiments of the present disclosure, and the present disclosure may be implemented in various other combinations, modifications, and environments. In other words, the present disclosure may be changed or modified within the scope of the concept of the disclosure disclosed herein, within the equivalent scope of the disclosure, and/or within the skill and knowledge of the art. The described embodiments illustrate the best state of the art to implement the technical idea of the present disclosure, and various changes may be made thereto as demanded for specific applications and uses of the present disclosure. Accordingly, the detailed description is not intended to limit the present disclosure to the embodiments. Also, the appended claims should be construed as encompassing such other embodiments.

The invention claimed is:

1. A foreign substance blocking and hidden wiring structure of a seat long-rail, comprising:

a lower rail fixed to a vehicle body and comprising a slot portion formed in an upper portion thereof;

a block guide partially located on the lower rail and configured to protrude to an outside of the slot portion;

an upper rail located on an upper end of the lower rail and configured to be coupled to the block guide;

a slide block provided in plural at a position corresponding to the slot portion and configured to open the slot portion at a position corresponding to the upper rail;

a block guide pin formed on an upper surface of the block guide so as to allow the slide block to open or block the slot portion according to movement of the upper rail;

a lower cover extending along an upper surface of the lower rail and comprising a slit portion formed in an inner surface thereof; and an upper cover extending along an upper surface of the lower cover;

wherein the slide block located at a position corresponding to the upper rail is inserted into the slit portion according to movement of the upper rail.

2. The foreign substance blocking and hidden wiring structure of a seat long-rail according to claim 1, further comprising:

a wiring part located on the inner surface of the lower cover.

3. The foreign substance blocking and hidden wiring structure of a seat long-rail according to claim 2, wherein the slit portion comprises:

a wiring slit portion located adjacent to the upper cover and formed to allow the wiring part to be inserted thereinto; and a block slit portion located adjacent to the wiring slit portion and formed to allow the slide block to be inserted thereinto, and wherein the block slit portion comprises:

a left slit portion formed on a left side with respect to the slot portion; and a right slit portion formed on a right side with respect to the slot portion.

4. The foreign substance blocking and hidden wiring structure of a seat long-rail according to claim 3, wherein the wiring part comprises:

a wiring connector connected to a driving unit of the upper rail; and a wiring configured to apply an electric current to the vehicle body.

5. The foreign substance blocking and hidden wiring structure of a seat long-rail according to claim 3, wherein the slide block comprises a guide groove formed in a rear surface thereof in an oblique direction, and wherein the block guide pin is moved along the guide groove, whereby the slide block is inserted into the block slit portion.

6. The foreign substance blocking and hidden wiring structure of a seat long-rail according to claim 5, wherein the guide groove comprises:

an oblique portion formed to allow the block guide pin to be moved in the oblique direction; and a connection portion located at each of both ends of the oblique portion and formed to allow the block guide pin to be moved in a longitudinal direction, and wherein the block guide pin comprises:

a first block guide pin formed at a position corresponding to the connection portion and located on a surface of one end portion of the block guide oriented in a first direction so as to be adjacent to the left slit portion; and a second block guide pin formed at a position corresponding to the connection portion and located on a surface of an opposite end portion of the block guide oriented in a second direction so as to be adjacent to the right slit portion.

7. The foreign substance blocking and hidden wiring structure of a seat long-rail according to claim 6, wherein the first block guide pin is moved to the connection portion adjacent to the first direction of the block guide, and wherein the second block guide pin is moved to the connection portion adjacent to the second direction of the block guide.

8. The foreign substance blocking and hidden wiring structure of a seat long-rail according to claim 7, wherein, when the upper rail is moved in the first direction, the first block guide pin is moved to the oblique portion, whereby the slide block is inserted into the left slit portion, and the second block guide pin is moved to the oblique portion, whereby the slide block is moved to an upper surface of the slot portion.

9. The foreign substance blocking and hidden wiring structure of a seat long-rail according to claim 7, wherein, when the upper rail is moved in the second direction, the first block guide pin is moved to the oblique portion, whereby the slide block is moved to an upper surface of the slot portion, and the second block guide pin is moved to the oblique portion, whereby the slide block is inserted into the right slit portion.

10. The foreign substance blocking and hidden wiring structure of a seat long-rail according to claim 4, wherein, when the upper rail is moved in a longitudinal direction, the wiring is moved along an inner side of the wiring slit portion.

* * * * *